United States Patent
Chen et al.

(10) Patent No.: US 11,627,260 B2
(45) Date of Patent: Apr. 11, 2023

(54) ANTI-FLASHLIGHT CIRCUIT ASSEMBLY AND IMAGE SENSOR

(71) Applicant: OmniVision Sensor Solution (Shanghai) Co., Ltd, Shanghai (CN)

(72) Inventors: Shoushun Chen, Shanghai (CN); Menghan Guo, Shanghai (CN)

(73) Assignee: OMNIVISION SENSOR SOLUTION (SHANGHAI) CO., LTD, Shanghai (CN)

( * ) Notice: Subject to any disclaimer, the term of this patent is extended or adjusted under 35 U.S.C. 154(b) by 23 days.

(21) Appl. No.: 17/368,896

(22) Filed: Jul. 7, 2021

(65) Prior Publication Data

US 2022/0030155 A1    Jan. 27, 2022

Related U.S. Application Data

(63) Continuation of application No. PCT/CN2019/073408, filed on Jan. 28, 2019.

(30) Foreign Application Priority Data

Jan. 9, 2019 (CN) .......................... 201910020952.2

(51) Int. Cl.
H04N 5/235 (2006.01)
(52) U.S. Cl.
CPC ......... *H04N 5/2357* (2013.01); *H04N 5/2351* (2013.01)
(58) Field of Classification Search
CPC .... H04N 5/2357; H04N 5/2351; H04N 5/341; H04N 5/357; H04N 5/3745; H04N 5/3696
See application file for complete search history.

(56) References Cited

U.S. PATENT DOCUMENTS

| | | | | |
|---|---|---|---|---|
| 9,628,738 | B2 * | 4/2017 | Chen | G02B 5/204 |
| 10,819,914 | B2 * | 10/2020 | Hamaguchi | H04N 5/2352 |
| 2010/0201868 | A1 | 8/2010 | Che et al. | |
| 2016/0119569 | A1 * | 4/2016 | Chen | H04N 5/2351 348/308 |
| 2018/0191972 | A1 * | 7/2018 | Berner | G06T 7/20 |
| 2018/0268553 | A1 * | 9/2018 | Chen | H04N 5/37455 |

FOREIGN PATENT DOCUMENTS

| | | |
|---|---|---|
| CN | 1902907 A | 1/2007 |
| CN | 105357430 A | 2/2016 |
| CN | 106162000 A | 11/2016 |
| CN | 108449557 A | 8/2018 |

OTHER PUBLICATIONS

PCT/CN2019/073408 PCT/ISA210 dated Oct. 9, 2019.

* cited by examiner

*Primary Examiner* — Luong T Nguyen
(74) *Attorney, Agent, or Firm* — IPRO, PLLC

(57) ABSTRACT

The present disclosure provides an anti-flashlight circuit assembly and an image sensor. The anti-flashlight circuit assembly includes a plurality of flashlight detection units. Each flashlight detection unit includes: a first photoelectric detection module configured to monitor an optical signal in real time and output a corresponding electric signal; a first triggering generation module configured to generate a first triggering generation signal when the electric signal exceeds a predetermined threshold, and output the first triggering generation signal to a first interface logic module; and the first interface logic module configured to output a triggering state signal upon the receipt of the first triggering generation signal.

20 Claims, 5 Drawing Sheets

ANTI-FLASHLIGHT CIRCUIT ASSEMBLY AND IMAGE SENSOR

CROSS-REFERENCE TO RELATED APPLICATION

This application claims a priority of the Chinese patent application No. 201910020952.2 filed on Jan. 9, 2019, which is incorporated herein by reference in its entirety.

TECHNICAL FIELD

The present disclosure relates to the field of image collection technology, in particular to an image sensor having an anti-flashlight circuit assembly and for motion detection.

BACKGROUND

Motion detection, especially high-speed motion detection, has been widely used in various fields such as automation control, industrial monitoring, scientific research and military industry. In a current visual processing system, the motion detection is mainly implemented through analyzing and calculating original image data from a front-end image sensor using a related algorithm executed by a back-end processing chip.

During the motion detection, an image frame outputted by an active pixel sensor contains a lot of redundancy information (usually the redundancy information is static or slowly-changed background information in a field of view), and a very large output bandwidth is occupied for the transmission of the redundancy information. In addition, when analyzing and calculating the redundancy information, a storage capacity and a computing capacity of the back-end processing system are highly demanded. Hence, during the high-speed motion detection, the cost of a high-speed camera increases when the active pixel sensor is adopted.

Recently, a dynamic vision image sensor which merely senses dynamic information in the field of view has attracted more and more attention due to its advantage in the motion detection. The dynamic vision image sensor merely pays attention to a dynamic component which causes a change in light intensity in the field of view, and automatically filter out useless background information, with such a concept of image frame being abandoned. To be specific, each pixel unit in the sensor does not passively sense the light intensity any longer. Instead, it monitors the change in the light intensity in real time on its own initiative, and then outputs position information when the change in the light intensity meets a predetermined condition. In this way, the useless background information is filtered out automatically at the sensor, i.e., the dynamic vision image sensor merely outputs useful data flow information about the pixel units, so it is able to save the transmission bandwidth. At this time, the back-end image processing system may directly acquire, and process, the useful dynamic information in the field of view, so as to remarkably reduce the requirements on the storage capacity and the computing capacity and improve the real-time performance.

However, in the case of a flashlight phenomenon in the field of view, the pixel unit may also sense the change in the light intensity at a corresponding region, and the dynamic vision image sensor may output data. This flashlight phenomenon is completely irrelevant to the motion of an object, and it merely reflects an instantaneous or periodical change in the light intensity at some positions in the field of view. For example, in such scenarios as a moment when a vehicle enters or leaves a tunnel and a moment when a lamp in a room is turned on or off suddenly, when there is a global flashlight phenomenon in the field of view, the change in the light intensity is detected by all the pixel units, and the information is outputted by the sensor. In these scenarios, the information from all the pixel units are outputted by the sensor. However, the information is useless and occupies a very large transmission bandwidth. More seriously, before the transmission of the useless information, it is impossible for the sensor to respond to the motion information acquired subsequently in the field of view, and at this time, the advantage of the dynamic vision image sensor has been lost.

Hence, there is an urgent need to provide a scheme to prevent the conventional dynamic vision image sensor from being adversely affected by the global flashlight phenomenon.

SUMMARY

An object of the present disclosure is to provide an anti-flashlight circuit assembly and an image sensor, so as to solve or at least alleviate at least one of the above-mentioned problems.

In one aspect, the present disclosure provides in some embodiments a flashlight detection unit, including: a first photoelectric detection module configured to monitor an optical signal in real time and output a corresponding electric signal; a first triggering generation module, a first input end of which is coupled to the first photoelectric detection module, a first output end of which is coupled to a first interface logic module, and which is configured to generate a first triggering generation signal when the electric signal exceeds a predetermined threshold, and output the first triggering generation signal to the first interface logic module; and the first interface logic module, a first input end of which is coupled to the first triggering generation module, a second input end of which is coupled to a flashlight detection control unit via a flashlight detection refreshing signal line, a first output end of which is coupled to the flashlight detection control unit via a flashlight detection triggering signal line, and which is configured to output a triggering state signal upon the receipt of the first triggering generation signal.

In a possible embodiment of the present disclosure, a second input end of the first triggering generation module is coupled to the flashlight detection control unit via the flashlight detection refreshing signal line, and the first triggering generation module is further configured to receive a flashlight detection refreshing signal from the flashlight detection control unit, and not generate the first triggering generation signal upon the receipt of the flashlight detection refreshing signal.

In a possible embodiment of the present disclosure, the first triggering generation module includes: a first pre-processing sub-module, an input end of which is coupled to an output end of the first photoelectric detection module, and which is configured to pre-process the electric signal to generate a processed electric signal; and a first threshold comparison sub-module, an input end of which is coupled to an output end of the first pre-processing sub-module, and which is configured to determine whether a change in the processed electric signal meets a predetermined condition.

In a possible embodiment of the present disclosure, the first interface logic unit further includes a first latch configured to store and represent a current operating state, a resetting signal for the first latch is the flashlight detection refreshing signal generated by the flashlight detection control unit, and a setting signal for the first latch is the first triggering generation signal generated by the first triggering generation module.

In another aspect, the present disclosure provides in some embodiments an anti-flashlight circuit assembly, including: a flashlight detection pixel array including a plurality of the above-mentioned flashlight detection units, and configured to response to a change in a light intensity in a field of view and output a triggering state signal to a flashlight detection control unit when the change in the light intensity exceeds a predetermined threshold; and the flashlight detection control unit coupled to the flashlight detection pixel array, and configured to determine whether there is global flashlight in the field of view in accordance with the triggering state signal, and transmit a flashlight detection mandatory resetting signal to a core circuit assembly when there is the global flashlight.

In a possible embodiment of the present disclosure, the flashlight detection control unit is further configured to periodically output a flashlight detection refreshing signal to the flashlight detection pixel array.

In a possible embodiment of the present disclosure, the flashlight detection control unit includes: a refreshing sub-unit coupled to the flashlight detection pixel array via a flashlight detection refreshing signal line, and configured to output the flashlight detection refreshing signal to the flashlight detection pixel array; and a decision-making sub-unit coupled to the flashlight detection pixel array via the flashlight detection triggering signal line, coupled to the core circuit assembly via a flashlight detection mandatory resetting signal line, and configured to receive the triggering state signal from the flashlight detection pixel array, and output the flashlight detection mandatory resetting signal to the core circuit assembly when there is the global flashlight.

In yet another aspect, the present disclosure provides in some embodiments an image sensor, including: a core circuit assembly including a plurality of primary pixel units, and configured to trigger a corresponding primary pixel unit when a change in a light intensity in a field of view reaches a threshold and output address information about the triggered primary pixel unit; and the above-mentioned anti-flashlight circuit assembly surrounding the core circuit assembly, and configured to detect whether there is global flashlight in the field of view, and reset the core circuit assembly when there is the global flashlight to prevent the core circuit assembly from responding to the global flashlight and outputting information.

In a possible embodiment of the present disclosure, the anti-flashlight circuit assembly includes a plurality of flashlight detection units configured to detect the change in the light intensity in the field of view within a flashlight detection period and determine whether there is the global flashlight in the field of view in accordance with the change in the light intensity in the field of view.

In a possible embodiment of the present disclosure, the core circuit assembly includes: a primary pixel array including a plurality of primary pixel units, and configured to monitor the change in the light intensity in the field of view, and enter a triggered state when the change in the light intensity meets a predetermined condition; a reading unit configured to respond to the primary pixel unit in the triggered state and output address information about the primary pixel unit; and a primary pixel array control unit configured to transmit a global resetting signal to each primary pixel unit to control an operating state of each primary pixel unit.

In a possible embodiment of the present disclosure, the primary pixel array control unit is further configured to, during the initialization, transmit the global resetting signal to each primary pixel unit in the primary pixel array via a global resetting signal line so as to turn off the primary pixel unit, and upon the receipt of a flashlight detection mandatory resetting signal from the anti-flashlight circuit assembly, transmit the global resetting signal to each primary pixel unit in the primary pixel array via the global resetting signal line so as to turn off the primary pixel unit.

In a possible embodiment of the present disclosure, the reading unit includes: a row selection module configured to response to a row request signal from the primary pixel array, and output row address information about a row which has responded to the row request signal; a column selection module configured to response to a column request signal from the primary pixel array, and output column address information about a column which has responded to the column request signal; and a reading control module configured to control the output of the row address information and the column address information.

According to the embodiments of the present disclosure, the anti-flashlight circuit assembly is arranged in such a manner as to surround the core circuit assembly, so as to remarkably prevent the image sensor (e.g., a dynamic vision sensor) from being adversely affected by a global flashlight phenomenon. To be specific, the anti-flashlight circuit assembly includes the flashlight detection pixel array and the flashlight detection control unit, and the flashlight detection pixel array includes a plurality of flashlight detection units surrounding the primary pixel unit in the core circuit assembly. Each flashlight detection unit may detect the change in the light intensity in the field of view, and when the change in the light intensity exceeds a threshold, output a triggering state signal to the flashlight detection control unit. As a result, it is able to remarkably reduce a failure time of the image sensor caused by the global flashlight, thereby to improve the resistance of the image sensor to the global flashlight.

BRIEF DESCRIPTION OF THE DRAWINGS

In order to achieve the above and related objects, some descriptive aspects will be described in conjunction with the following description and drawings, and these aspects indicate various ways capable of practicing a principle of the present disclosure. All aspects and equivalent aspects thereof shall fall within the scope of the present disclosure. The above and other objects, features and advantages will become more apparent on the basis of the drawings in conjunction with the following description. Same reference signs represent a same component or element.

DETAILED DESCRIPTION

The present disclosure will be described hereinafter in more details in conjunction with the drawings and embodiments. The following embodiments are for illustrative purposes only, but shall not be used to limit the scope of the present disclosure. In contrast, the following embodiments are provided so as to facilitate the understanding of the present disclosure.

Dynamic information in a field of view is detected by a dynamic vision image sensor (dynamic vision sensor for short) at a pixel level. Each pixel unit in the sensor monitors a change in a light intensity in real time, and when the change reads a certain threshold, outputs position information about the pixel unit. Due to the movement of an object, the change in the light intensity occurs in a corresponding region in the field of view sensed by a corresponding pixel unit, so the object moving the field of view may be detected. However, the change in the light intensity sensed by the pixel unit may also be caused by a flashlight phenomenon in the field of view. At this time, data outputted by the dynamic vision sensor is completely irrelevant to the movement of the object, and instead, it merely reflects an instantaneous or periodical change in the light intensity at some positions in the field of view. In the embodiments of the present disclosure, the flashlight phenomenon in the field of view includes a local flashlight phenomenon and a global flashlight phenomenon.

For the local flashlight phenomenon, e.g., a Light-Emitting Diode (LED) lamp flickering at a fixed frequency in the field of view, the dynamic vision sensor may detect and report a position of the LED lamp, and this application is usually necessary and advantageous. At first, the output of local dynamic information will not occupy too much transmission bandwidth. Next, the detection of a flickering object (e.g., lamp), e.g., the detection of traffic light in an auxiliary driving system, is highly necessary in some application scenarios. However, for the global flashlight phenomenon, the dynamic vision sensor will be seriously adversely affected. Hence, a main object of the present disclosure is to improve the resistance of the image sensor to the global flashlight phenomenon.

Figure 1:
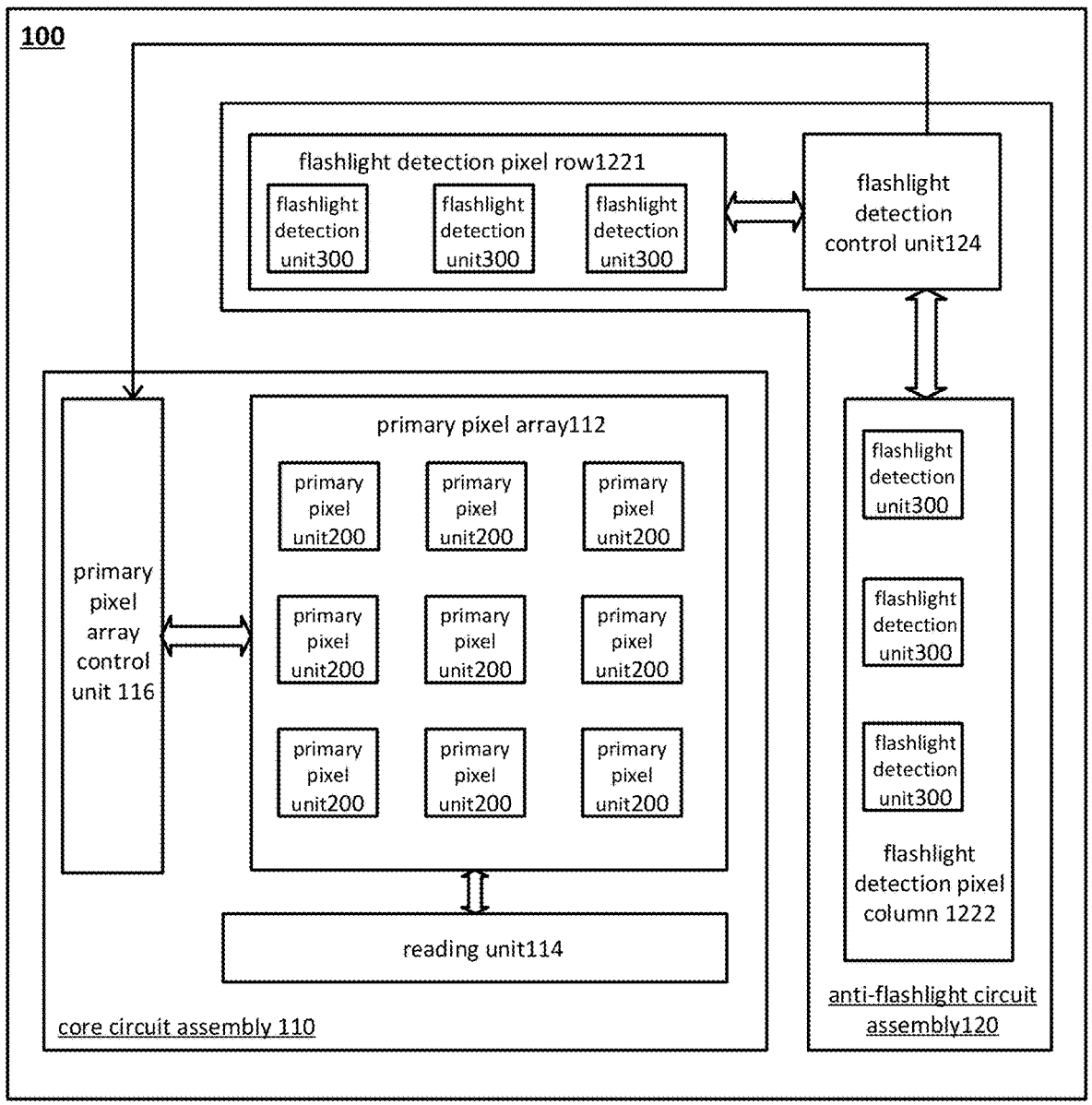
FIG. 1 is a schematic view showing an image sensor 100 according to one embodiment of the present disclosure.

FIG. 1 is a schematic view showing an image sensor 100 according to one embodiment of the present disclosure.

On the basis of a structure of an existing dynamic vision sensor, the image sensor 100 is provided with an additional circuit having an anti-flashlight function, so as to enable the image sensor 100 to detect and track an object moving at a high speed, and improve its resistance to global flashlight in a better manner. During the implementation, the image sensor 100 is coupled to an external image collection system, and configured to output data to the external image collection system for subsequent calculation, which will not be particularly defined herein.

As shown in FIG. 1, the image sensor 100 at least includes a core circuit assembly 110 and an anti-flashlight circuit assembly 120. The core circuit assembly 110 is configured to achieve a core function of the image sensor 100, and it mainly includes a plurality of primary pixel units. When a change in a light intensity in a field of view reaches a threshold, a primary pixel unit at a corresponding region may be triggered, and the core circuit assembly 110 may output address information about the triggered primary pixel unit. The anti-flashlight circuit assembly 120 is arranged in such a manner as to surround the core circuit assembly 110, and configured to detect and determine global flashlight in the field of view. In addition, the anti-flashlight circuit assembly 120 is further configured to reset the core circuit assembly 110 in the case of the global flashlight, so as to prevent the core circuit assembly 110 to respond to the global flashlight and output the corresponding data.

Figure 2:
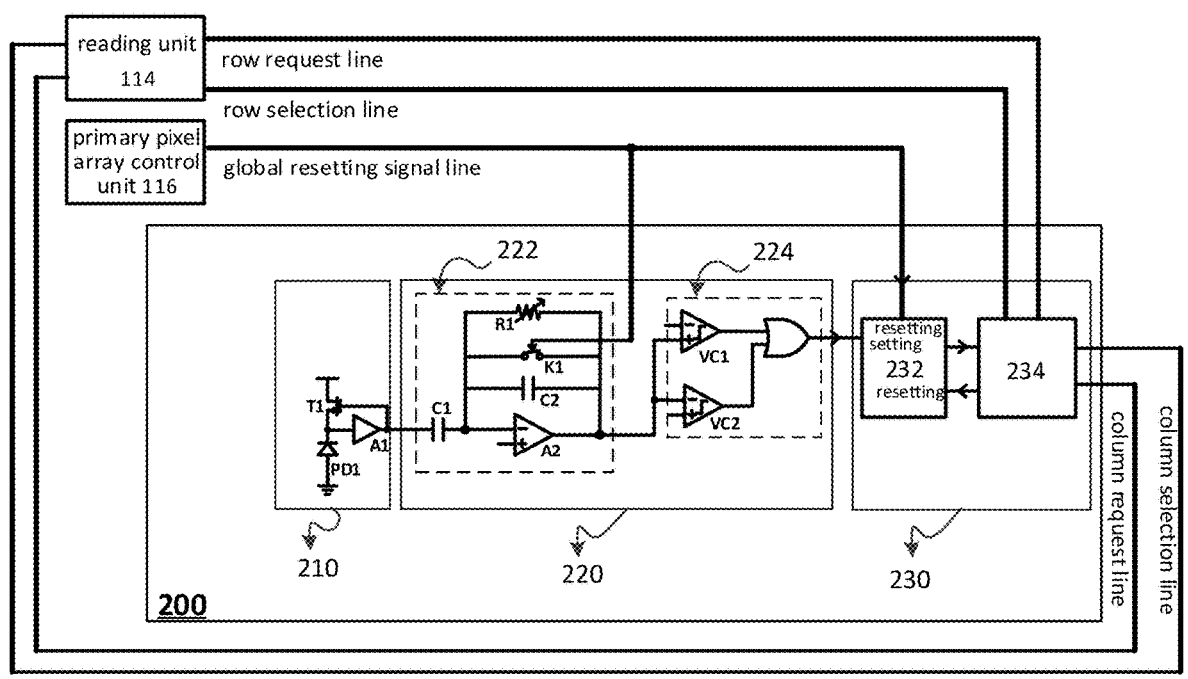
FIG. 2 is a schematic view showing a primary pixel unit 200 according to one embodiment of the present disclosure.

In the embodiments of the present disclosure, the core circuit assembly 110 may detect dynamic information in the field of view and output the data. The core circuit assembly 110 may further include a primary pixel array 112, a reading unit 114 and a primary pixel array control unit 116. As shown in FIG. 1, the primary pixel array 112 consists of a plurality of one-dimension or two-dimension pixel collection circuits (also called as primary pixel unit), and FIG. 2 shows a structure of the primary pixel unit 200. FIG. 1 illustratively shows a 3*3 primary pixel array. Each primary pixel unit 200 may independently monitor the change in the light intensity at a corresponding region in real time, and when the change in the light intensity meets a predetermined condition (e.g., the change in the light intensity exceeds the predetermined threshold), the primary pixel unit 200 may be in a triggered state. In a possible embodiment of the present disclosure, the threshold for the change in the light intensity may be adjusted in accordance with different application scenarios through a filter in the primary pixel unit (e.g., a high-pass filter), so that merely the change in the light intensity which has reached a certain threshold may be considered as dynamic information and then monitored. When the primary pixel unit 220 enters the triggered state, it may transmit a request signal to the reading unit 114. Upon the receipt of the request signal, the reading unit 114 may encode the address information about the primary pixel unit 200 (including a row address and a column address) and then output the encoded address information. The primary pixel array control unit 116 may be coupled to each primary pixel unit 200 via a global resetting signal line, and transmit a global resetting signal to the primary pixel unit 200 so as to control a state thereof.

In the embodiments of the present disclosure, an operating state of the core circuit assembly 110 may depend on the global resetting signal from the primary pixel array control unit 116. During the initialization, the primary pixel array control unit 116 may transmit the global resetting signal to each primary pixel unit 200 of the primary pixel array 112 via the global resetting signal line, so as to turn off each primary pixel unit 200 and initialize the entire primary pixel array 112, i.e., enable each primary pixel unit 200 not to respond to the change in the light intensity in the field of view. In addition, when the global resetting signal is active, the reading unit 114 may also be reset, and the core circuit assembly 110 may enter a light-intensity detection resetting state, i.e., it may neither respond to the change in the light intensity in the field of view nor output any data. After the global resetting signal has been cancelled, the core circuit assembly 110 of the image sensor 100 may enter a light-intensity detection enabling state, and starts to operate normally. Apart from the above-mentioned resetting operations during the initialization, the primary pixel array control unit 116 may further receive a light-intensity detection mandatory resetting signal from the anti-flashlight circuit assembly 120, and transmit the global resetting signal to each primary pixel unit 200 of the primary pixel array 112 via the global resetting signal, so as to turn off the primary pixel unit 200, i.e., to enable the primary pixel unit 200 not to respond to the change in the light intensity in the field of view.

In the embodiments of the present disclosure, the anti-flashlight circuit assembly 120 surrounding the core circuit assembly 110 is mainly configured to improve the resistance to the global flashlight for the image sensor 100. As shown in FIG. 1, the anti-flashlight circuit assembly 120 further includes a flashlight detection pixel array 122 and a flashlight detection control unit 124.

Figure 3:
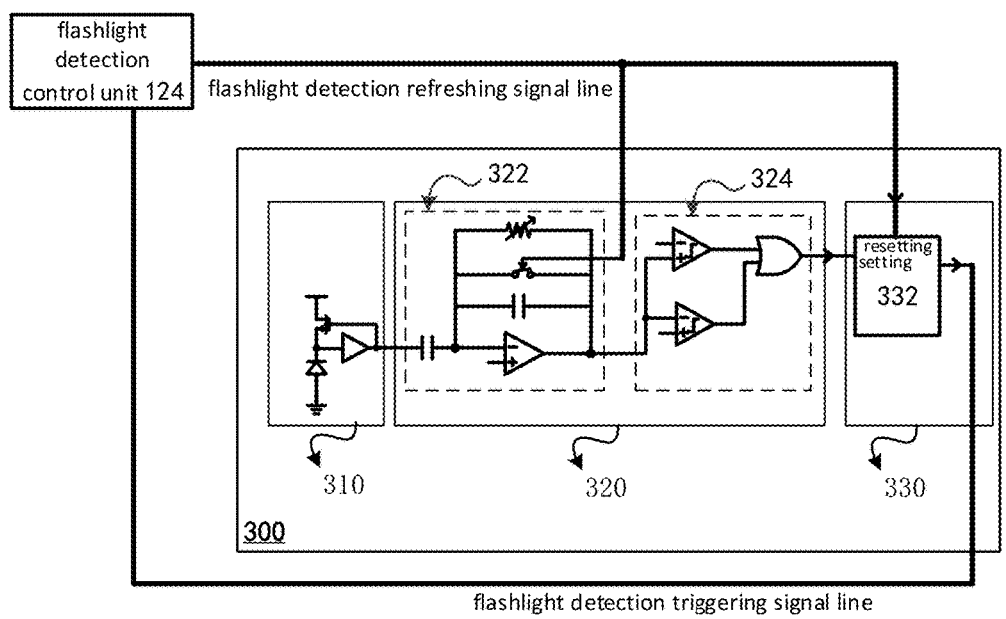
FIG. 3 is a schematic view showing a flashlight detection unit 300 according to one embodiment of the present disclosure.

The flashlight detection pixel array 122 consists of a plurality of one-dimension or two-dimension flashlight detection circuits (also called as flashlight detection units). More specifically, the flashlight detection pixel array 122 may further include at least one flashlight detection pixel row 1221 and/or at least one flashlight detection pixel column 1222. The flashlight detection units 300 may be arranged in rows and columns and surround the primary pixel array 112. FIG. 3 shows a specific structure of the flashlight detection unit 300. For ease of description, in FIG. 1, one flashlight detection pixel row 1221 includes three flashlight detection units and it is arranged at an upper side of the primary pixel array 112, and one flashlight detection pixel column 1222 includes three flashlight detection units and it is arranged at a right side of the primary pixel array 112. Of course, the present disclosure shall not be limited thereto. More flashlight detection pixel rows may be arranged at the upper side of the primary pixel array 112, and more flashlight detection pixel columns may be arranged at the right side of the primary pixel array 112. Identically, the flashlight detection pixel rows and flashlight detection pixel columns may also be arranged at a lower side and a left side of the primary pixel array 112 respectively. The flashlight detection unit 300 may have a basic function substantially the same as the primary pixel unit 200, i.e., it may detect the change in the light intensity in the field of view and output the triggering state signal to the flashlight detection control unit 124 when the change in the light intensity exceeds the predetermined threshold. The flashlight detection units 300 may surround the primary pixel array 112 and detect the change in the light intensity at an outermost region in the field of view. The flashlight detection control unit 124 may be coupled to the flashlight detection pixel array 122, and configured to control the flashlight detection pixel array 122. In a possible embodiment of the present disclosure, the flashlight detection control unit 124 may determine whether there is the global flashlight in the field of view in accordance with the triggering state signal. For example, when the triggering state signal has been transited by each flashlight detection unit 300 of the flashlight detection pixel array 122 to the flashlight detection control unit 124 within a short time period, the flashlight detection control unit 124 may determine that there is the global flashlight. In some embodiments of the present disclosure, a flashlight detection period (usually a short period) may be set in advance, and upon the receipt of the triggering state signal from each flashlight detection unit 300 of the flashlight detection pixel array 122 within the flashlight detection period, the flashlight detection control unit 124 may determine that there is the global flashlight, and then transmit a flashlight detection mandatory resetting signal to the core circuit assembly 110 (e.g., the primary pixel array control unit 116), so as to turn off the primary pixel array 112. In a possible embodiment of the present disclosure, the primary pixel array 112 may be in an off state within a short time period.

It should be appreciated that, in the embodiments of the present disclosure, the flashlight detection pixel array 122 needs to detect the global flashlight within a short detection period rather than a long time period. This is because, (1) usually the flashlight phenomenon occurs instantaneously, so all the primary pixel units 200 and all the flashlight detection units 300 may be triggered within a short time period; and (2) when the detection period is too long, all the flashlight detection units 300 may be finally triggered by noises, background information that slowly changes in the field of view or any normal dynamic information, and thereby a fault detection result may occur. Hence, the flashlight detection pixel array 122 needs to be refreshed periodically. In some other embodiments of the present disclosure, the flashlight detection control unit 124 may periodically output a flashlight detection refreshing signal to the flashlight detection pixel array 122, so as to periodically refresh the flashlight detection pixel array 122.

According to the image sensor 100 in the embodiments of the present disclosure, the dedicated anti-flashlight circuit assembly 120 may arranged in such a manner as to surround the core circuit assembly 110, so as to remarkably prevent the image sensor from being adversely affected by the global flashlight phenomenon. To be specific, the flashlight detection unit may detect the change in the light intensity within the field of view under the control of the flashlight detection control unit 124. The flashlight detection period may be set in advance, and when each flashlight detection unit of the flashlight detection pixel array 122 has detected the change in the light intensity that exceeds the threshold within the period, the flashlight detection control unit 124 may determine that there is the global flashlight in the field of view. At this time, the flashlight detection control unit 124 may force the primary pixel array 112 to be reset within a small time period, so as to prevent the primary pixel array 112 from responding to the global flashlight and outputting the corresponding data. It should be appreciated that, the resetting time period may be far smaller than a tie desired for outputting the information from all the pixels by the image sensor 110. As a result, it is able to remarkably reduce a failure time of the image sensor caused by the global flashlight, thereby to improve the resistance of the image sensor to the global flashlight.

The core circuit assembly 110 and the anti-flashlight circuit assembly 120 of the image sensor 100 will be further described hereinafter in conjunction with the drawings.

FIG. 2 is a schematic view showing the primary pixel unit 200 of the core circuit assembly 110. As shown in FIG. 2, the primary pixel unit 200 at least includes a second photoelectric detection module 210, a second triggering generation module 220 and a second interface logic module 230.

A first input end of the second triggering generation module 220 may be coupled to the second photoelectric detection module 210, a second input end thereof may be coupled to the primary pixel array control unit 116 via a global resetting signal line, and a first output end thereof may be coupled to the second interface logic module 230. A first input end of the second interface logic module 230 may be coupled to the second triggering generation module 220, a second input end thereof may be coupled to the primary pixel array control unit 116 via the global resetting signal line, a third input end and a fourth input end thereof may be coupled to the reading unit 114 via a row request line and a column request line respectively, and a first output end and a second output end thereof may be coupled to the reading unit 114 via a row selection line and a column selection line respectively.

The second photoelectric detection module 210 is configured to monitor an optical signal in real time, and output a corresponding electric signal to the second triggering generation module 220. In a possible embodiment of the present disclosure, the electric signal outputted by the second photoelectric detection module 210 may be a voltage signal or a current signal, and usually there is a logarithmic relationship between the electric signal and the optical signal.

The second photoelectric detection module 210 may be implemented in various forms, and the above is for illustrative purposes only. In the embodiments of the present disclosure, the second photoelectric detection module 210 may be a logarithmic photoelectric detectors. As shown in FIG. 2, the second photoelectric detection module 210 includes a photodiode PD1 whose anode is grounded, a first transistor T1 and a first amplifier A1. A source electrode of the first transistor T1 is coupled to a cathode of the photodiode PD1, and a drain electrode thereof is coupled to a power source VDD (not shown). The first amplifier A1 is coupled between the cathode of the photodiode PD1 and a gate electrode of the first transistor T1. Here, the first amplifier A1 is configured to increase a response speed with respect to a voltage change between the source electrode and the gate electrode of the first transistor T1.

The second triggering generation module 220 is configured to, when the electric signal exceeds the predetermined threshold, generate a second triggering generation signal to the second interface logic module 230.

In the embodiments of the present disclosure, the second triggering generation module 220 may include a second pre-processing sub-module 222 and a second threshold comparison sub-module 224. An input end of the second pre-processing sub-module 222 may be coupled to an output end of the second photoelectric detection module 210, and an input end of the second threshold comparison sub-module 224 may be coupled to an output end of the second pre-processing sub-module 222. The second pre-processing sub-module 222 may be coupled to the global resetting signal line.

The second pre-processing sub-module 222 may pre-process the electric signal and generate a processed electric signal. Here, the so-called "pre-processing" mainly refers to, but not limited to, amplification and/or filtration. In the embodiments of the present disclosure, the electric signal may be amplified, so as to improve the sensitivity of the primary pixel unit to the change in the light intensity. In addition, a low-frequency component in the electric signal may be filtered out, so as to enable the primary pixel unit not to detect the background information which changes very slowly. The second threshold comparison sub-module 224 may determine whether a change in the processed electric signal meets a predetermined condition. To be specific, the second threshold comparison sub-module 224 may determine whether an amplitude of the processed electric signal exceeds a predetermined threshold, and when the amplitude of the processed electric signal exceeds the predetermined threshold, output the second triggering generation signal to the second interface logic module 230. In the embodiments of the present disclosure, the second triggering generation module 220 may be controlled by the global resetting signal from the primary pixel array control unit 116. When the global resetting signal is active, the second pre-processing sub-module 222 of the second triggering generation module 220 may be turned off, and may not respond to the electric signal from the second photoelectric detection module 210.

Identically, the second pre-processing sub-module 222 and the second threshold comparison sub-module 224 may each be implemented in various forms, which will not be particularly defined herein.

As shown in FIG. 2, the second pre-processing sub-module 222 includes a first capacitor C1, a second amplifier A2, a second capacitor C2, an adjustable resistor R1 and a first switch K1. A first end of the first capacitor C1 is coupled to the output end of the second photoelectric detection module 210, an input negative pole of the second amplifier A2 is coupled to a second end of the first capacitor C1, and an input positive pole of the second amplifier A2 is configured to receive a fixed potential. The second capacitor C2, the adjustable resistor R1 and the first switch K1 are connected in parallel between the input negative pole and output end of the second amplifier A2. Here, the second capacitor C1 is configured to isolate a direct current component in the electric signal from the second photoelectric detection module 210, and a gain of the second pre-processing sub-module 222 depends on a ratio of a capacitance of the first capacitor C1 to a capacitance of the second capacitor C2. An RC network consisting of the second capacitor C2 and the adjustable resistor R1 is configured to filter out a signal component in an alternating current component in a signal from a previous stage whose frequency is smaller than a frequency threshold. The frequency threshold may be adjusted in accordance with different resistances of the adjustable resistor R1.

The second threshold comparison sub-module 224 includes a first voltage comparator VC1, a second voltage comparator VC2 and an OR logic unit. A reverse-phase input end of the first voltage comparator VC1 is configured to receive a fixed level representing a first threshold, and a same-phase input end thereof is coupled to the output end of the second pre-processing sub-module 222. A same-phase input end of the second voltage comparator VC2 is configured to receive another fixed level representing a second threshold, and a reverse-phase input end thereof is coupled to the output end of the second pre-processing sub-module 222. The OR logic unit is coupled to the output ends of the first voltage comparator VC1 and the second voltage comparator VC2, and configured to perform an OR logic operation on outputs of the first voltage comparator and the second voltage comparator. When an output signal of the second pre-processing sub-module 222 is greater than the first threshold or the second threshold, the OR logic unit may output an active second triggering generation signal to the second interface logic module 230.

The second interface logic module 230 is configured to transmit a row request signal to the reading unit 114 upon the receipt of the second triggering generation signal, transmit a column request signal to the reading unit 114 upon the receipt of a row selection signal from the reading unit 114, and turn on the second triggering generation module 220 upon the receipt of the row selection signal and a column selection signal.

In a possible embodiment of the present disclosure, the second interface logic unit 230 may further include a second latch 232 and a handshake protocol control logic 234. The second latch 232 is configured to store and represent an operating state of a current primary pixel unit 200. The handshake protocol control logic 234 is configured to process an interaction between the primary pixel unit 200 and the reading unit 114. In the embodiments of the present disclosure, when a first resetting signal received by the second interface logic module 230 is the global resetting signal from the primary pixel array control unit 116, the second latch 232 may be reset. When a resetting signal received by the second interface logic module 230 is the second triggering generation signal from the second triggering generation module 220, the second latch 232 may be set and the primary pixel unit 200 may enter the triggered state. After the second latch 232 has been set, the handshake protocol control logic 232 may be activated, and transmit the row request signal to the reading unit 114. The reading unit 114 may generate a corresponding row selection signal in response to the row request signal, and the handshake protocol control logic 234 of the primary pixel unit 200 may set the column request signal as active. The reading unit 114 may then respond to the column request signal in a column direction and generate a corresponding column selection signal. Upon the receipt of the row selection signal and the column selection signal, the handshake protocol control logic 234 may output a second resetting signal to the second latch 232 and turn on the second triggering generation module 220. At this time, the primary pixel unit 200 may detect the change in the light intensity in the field of view again.

In addition, as shown in FIG. 2, when the second latch 232 of the primary pixel unit 200 has been set, the second triggering generation module 220 of the primary pixel unit 200 may also be turned off (i.e., the switch K1 of the second pre-processing sub-module 22 may be turned on, so that the second pre-processing sub-module 222 does not respond to the output from the second photoelectric detection module 210 any longer). Hence, the primary pixel unit 200 may not respond to the change in the light intensity.

Apart from the primary pixel array 112 consisting of the primary pixel units 200, the core circuit assembly 110 may further include the reading unit 114 and the primary pixel array control unit 116.

In the embodiments of the present disclosure, the reading unit 114 may at least include a row selection module, a column selection module and a reading control module. The reading unit 114 is configured to respond to the primary pixel unit in the triggered state in the primary pixel array 112, encode the address information about a row and a column where the primary pixel unit is located, and output the encoded address information to an external processor. In the reading operation, the row selection module may manage the row request signal from the primary pixel unit in a row direction, and select one row through setting a certain row selection line as active. When a certain row has been selected, the corresponding row address information may also be encoded by the reading unit 114 and transmitted to the external processor. Correspondingly, the column selection module may manage the column request signal from the primary pixel unit in the column direction, and select one column through setting a certain column selection line as active. When a certain column has been selected, the corresponding column address information may also be encoded by the reading unit 114 and transmitted to the external processor. When the primary pixel units in the triggered state in the selected row has been read by the column selection module, the reading control module may notify the row selection module to switch to a next row and repeat the above-mentioned reading operation.

In the embodiments of the present disclosure, the row selection module may receive the row request signal from at least one primary pixel unit of the primary pixel array 112 but merely output a row response signal with respect to one of the row request signals. In a possible embodiment of the present disclosure, the row selection module may respond to a plurality of row request signals sequentially through a scanner, or the row selection module may respond to the plurality of row request signals randomly. In order to prevent the occurrence of a conflict, the row selection module may merely respond to one row request signal each time. Correspondingly, the column selection module may receive the column request signal from at least one primary pixel unit of the primary pixel array 112 but merely output a column response signal with respect to one of the column request signals. In a possible embodiment of the present disclosure, the column selection module may respond to a plurality of column request signals sequentially through a scanner, or the column selection module may respond to the plurality of column request signals randomly. In order to prevent the occurrence of a conflict, the column selection module may merely respond to one column request signal each time.

The primary pixel array control unit 116 may transmit the global resetting signal to each primary pixel unit of the primary pixel array 112 via the global resetting signal line. When the global resetting signal is active, the second triggering generation module 220 of the primary pixel unit may be turned off, and the second latch 232 of the second interface logic module 230 may also be reset. At this time, the image sensor 100 may not respond to the change in the light intensity in the field of view.

In the embodiments of the present disclosure, the global resetting signal may be active in two circumstances. In a first circumstance, before the image sensor 100 starts to operate, the global resetting signal may be active so as to initialize the entire primary pixel array 112. In a second circumstance, after the flashlight detection mandatory resetting signal has been generated by the flashlight detection control unit 124, the global resetting signal may also be active within a short time period, so as to reset the entire primary pixel array 112, and prevent the primary pixel array 112 from detecting and responding to the global flashlight.

FIG. 3 is a schematic view showing the flashlight detection unit 300 according to one embodiment of the present disclosure.

As shown in FIG. 3, similar to the primary pixel unit 200, the flashlight detection unit 300 at least includes a first photoelectric detection module 310, a first triggering generation module 320 and a first interface logic module 330. A first input end of the first triggering generation module 320 is coupled to the first photoelectric detection module 310, a first output end of the first triggering generation module 320 is coupled to a first input end of the first interface logic module 330, a second input end of the first interface logic module 330 is coupled to the flashlight detection control unit 124 via the flashlight detection refreshing signal line, and a first output end of the first interface logic module 330 is coupled to the flashlight detection control unit 124 via the flashlight detection triggering signal line.

In a possible embodiment of the present disclosure, the first photoelectric detection module 310 is configured to monitor an optical signal in real time, and output a corresponding electric signal to the first triggering generation module 320. The first photoelectric detection module 310 may be implemented in various forms. As shown in FIG. 3, the first photoelectric detection module 310 is of a same structure as the second photoelectric detection module 210 of the primary pixel unit 200. The first photoelectric detection module 310 includes a photodiode PD1 whose anode is grounded, a first transistor T1 and a first amplifier A1. A source electrode of the first transistor T1 is coupled to a cathode of the photodiode P1, and a drain electrode thereof is coupled to a power source VDD (not shown). The first amplifier A1 is coupled between the cathode of the photodiode PD1 and a gate electrode of the first transistor T1. More details about the first photoelectric detection module 310 may refer to those of the second photoelectric detection module 210, which will not be particularly defined herein.

The first triggering generation module 320 is configured to generate a first triggering generation signal to the first interface logic module 330 when the received electric signal exceeds a predetermined threshold. Upon the receipt of the first triggering generation signal, the first interface logic module 330 is configured to output a triggering state signal to the flashlight detection control unit 124 via the flashlight detection triggering signal line.

In a possible embodiment of the present disclosure, a second input end of the first triggering generation module 320 is coupled to the flashlight detection control unit 124 via the flashlight detection refreshing signal line, and configured to receive the flashlight detection refreshing signal from the flashlight detection control unit 124, and then turn off the first triggering generation module 320, i.e., enable the first triggering generation module 320 not to generate the first triggering generation signal.

In a possible embodiment of the present disclosure, the structure and the function of the first triggering generation module 320 may be the same as those of the second triggering generation module 220 of the primary pixel unit 200. For example, the first triggering generation module 320 may include a first pre-processing sub-module 322 and a first threshold comparison sub-module 324. An input end of the first pre-processing sub-module 322 may be coupled to an output end of the first photoelectric detection module 310, and the first pre-processing sub-module 322 is configured to pre-process the received electric signal to generate a processed electric signal. An input end of the first threshold comparison sub-module 324 may be coupled to an output end of the first pre-processing sub-module 322, and the first threshold comparison sub-module 324 is configured to determine whether a change in the processed electric signal meets a predetermined condition. As shown in FIG. 3, the first pre-processing sub-module 322 includes: a first capacitor C1, a first end of which is coupled to the output end of the first photoelectric detection module; a second amplifier A2, an input negative pole of which is coupled to a second end of the first capacitor C1, and an input positive pole of which is configured to receive a fixed potential; and a second capacitor C2, an adjustable resistor R1 and a first switch K1 connected in parallel to each other between the input negative pole and an output end of the second amplifier A2. The first threshold comparison sub-module 324 includes: a first voltage comparator VC1, a reverse-phase input end of which is configured to receive a fixed level representing a first threshold, and a same-phase input end of which is coupled to the output end of the first pre-processing sub-module; a second voltage comparator VC2, a same-phase input end of which is configured to receive a fixed level representing a second threshold, and a reverse-phase input end of which is coupled to the output end of the first pre-processing sub-module; and an OR logic unit coupled to output ends of the first voltage comparator and the second voltage comparator, and configured to perform an OR logic operation on outputs of the first voltage comparator and the second voltage comparator.

More details about the first triggering generation module 320 (including the first pre-processing sub-module 322 and the first threshold comparison sub-module 324) may refer to those about the second pre-processing sub-module 222 and the second threshold comparison sub-module 224 mentioned hereinabove, which will not be particularly defined herein.

The first interface logic module 330 may merely include a first latch 332 configured to store and represent a current operating state of the flashlight detection unit 300. A resetting signal of the first latch may be the flashlight detection refreshing signal generated by the flashlight detection control unit 124, and a setting signal may be the first triggering generation signal generated by the first triggering generation module 320. An output end of the first latch 332 may be coupled to the flashlight detection control unit 124 via the flashlight detection triggering signal line.

An operating state of the anti-flashlight circuit assembly 120 may depend on the flashlight detection refreshing signal from the flashlight detection control unit 124. When the flashlight detection refreshing signal is active, the anti-flashlight circuit assembly 120 may be in a flashlight detection refreshing state. At this time, the first triggering generation module 320 of the flashlight detection unit 300 may be turned off, and the first latch 332 of the first interface logic module 330 may be reset, so the flashlight detection unit 300 may not respond to the change in the light intensity. When the flashlight detection refreshing signal has been cancelled, the anti-flashlight circuit assembly 120 may be in the flashlight detection enabling state. At this time, the flashlight detection unit 300 may start to respond to the change in the light intensity in the field of view, and set the first latch 332 when the change exceeds the predetermined threshold. The output end of the first latch 332 of each flashlight detection unit 300 may be coupled to the flashlight detection control unit 124 via the flashlight detection triggering signal line, so as to determine whether there is the global flashlight in the field of view.

In the embodiments of the present disclosure, the flashlight detection control unit 124 may determine the quantity of flashlight detection units 300 in the triggered state through a corresponding bus. When all the flashlight detection units 300 have been triggered, the flashlight detection control unit 124 may determine that there is the global flashlight. At this time, the flashlight detection control unit 124 may output the flashlight detection mandatory resetting signal to the primary pixel array control unit 116, and the primary pixel array control unit 116 may set the global resetting signal as active, so as to temporarily turn off the entire core circuit assembly 110 and prevent it from responding to the global flashlight. After the flashlight detection mandatory resetting signal has been cancelled, the primary pixel array control unit 116 may cancel the global resetting signal, and the primary pixel array 112 may respond to the change in the light intensity in the field of view again. In addition, the flashlight detection control unit 124 needs to periodically refresh the flashlight detection pixel array 122, so as to prevent the fault flashlight detection caused by the movement of the object in the field of view or background drift within a long time period. In other words, the global flashlight occurs within a very short time period, so the flashlight detection control unit 124 must generate the flashlight detection mandatory resetting signal in such a manner that all the flashlight detection units 300 enter the triggered state within a very short time period.

Apart from the flashlight detection pixel array 122 consisting of the flashlight detection units 300, the anti-flashlight circuit assembly may further include the flashlight detection control unit 124.

Figure 4:
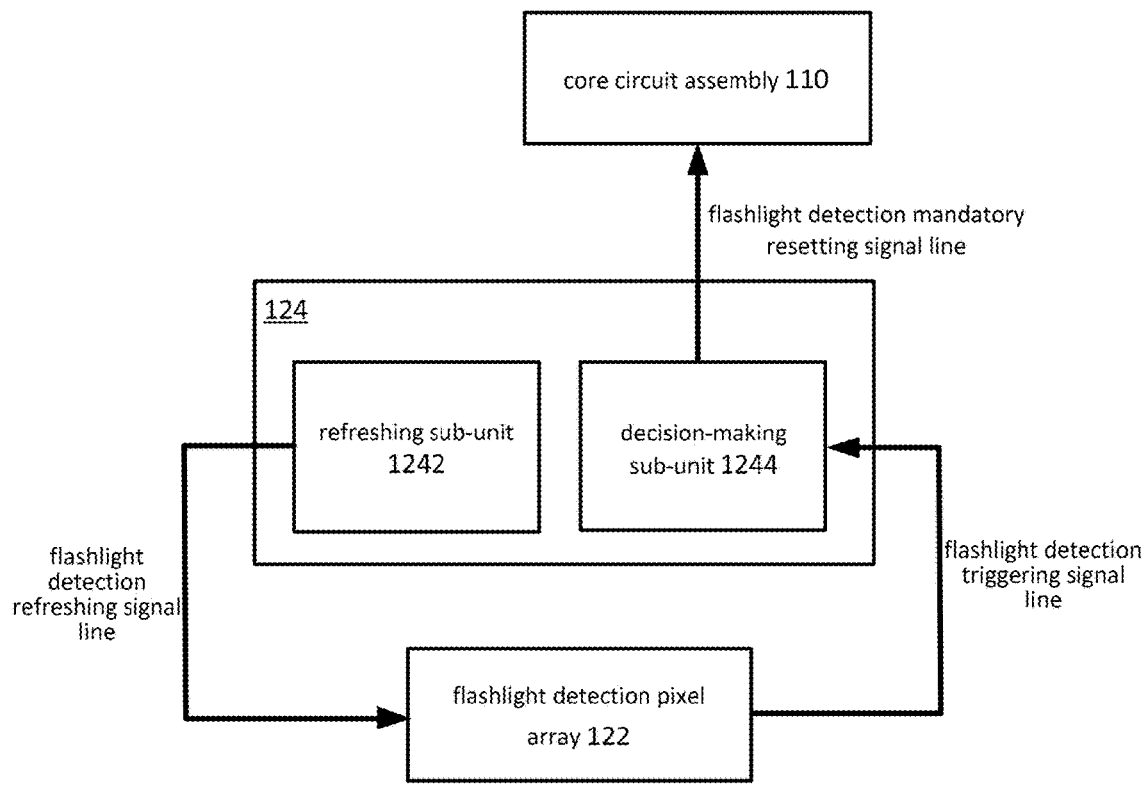
FIG. 4 is a schematic view showing a flashlight detection control unit 124 according to one embodiment of the present disclosure.

FIG. 4 is a schematic view showing the flashlight detection control unit 124 according to one embodiment of the present disclosure. As shown in FIG. 4, the flashlight detection control unit 124 includes a refreshing sub-unit 1242 and a decision-making sub-unit 1244.

In a possible embodiment of the present disclosure, the refreshing sub-unit 1242 may be coupled to the flashlight detection pixel array 122 via the flashlight detection refreshing signal line. To be specific, the refreshing sub-unit 1242 may be coupled to all the flashlight detection units 300 via the flashlight detection refreshing signal line, and configured to output the flashlight detection refreshing signal to the flashlight detection pixel array 122. When the flashlight detection refreshing signal is active, all the flashlight detection units 300 may be reset, and when the flashlight detection refreshing signal has been cancelled, all the flashlight detection units 300 may start to respond to the change in the light intensity.

In a possible embodiment of the present disclosure, the refreshing sub-unit 1242 may periodically output the flashlight detection refreshing signal to the flashlight detection pixel array 122. As mentioned hereinabove, the flashlight detection unit 300 may also respond to the object that moves normally or the background information that changes slowly in the field of view, so when no refreshing operation is perform, all the flashlight detection units 300 may finally be triggered, and at this time, the primary pixel unit 200 may perform the mandatory resetting operation erroneously. Hence, for the image sensor, it is necessary to periodically refresh the flashlight detection unit.

Apart from the refreshing sub-unit 1242, the decision-making sub-unit 1244 may be coupled to the flashlight detection pixel array 122 via the flashlight detection triggering signal line, and configured to receive the triggering state signal from the flashlight detection pixel array 122 and determine whether there is the global flashlight. In addition, the decision-making sub-unit 1244 may be further coupled to the core circuit assembly 110 via the flashlight detection mandatory resetting signal line (as shown in FIG. 1, the decision-making sub-unit 1244 may output the flashlight detection mandatory resetting signal to the primary pixel array control unit 116). In this way, when there is the global flashlight (all the flashlight detection units have been triggered), the decision-making sub-unit 1244 may output the flashlight detection mandatory resetting signal to the core circuit assembly 110, so as to forcibly reset the primary pixel array 112 within a short time period. In the embodiments of the present disclosure, a resetting time period may be constant, or adjustable by a user. Generally speaking, because a duration of the global flashlight is very short, the resetting time period may be set as tens of microseconds, so as to prevent the primary pixel unit from responding to the global flashlight and prevent the subsequent motion detection from being adversely affected.

Figure 5A:
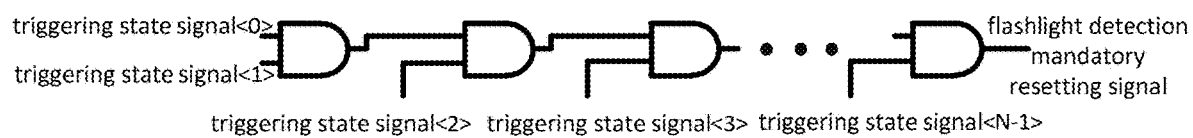
FIGS. 5A and 5B are schematic views showing a decision-making sub-unit 1244 according to one embodiment of the present disclosure.
Figure 5B:
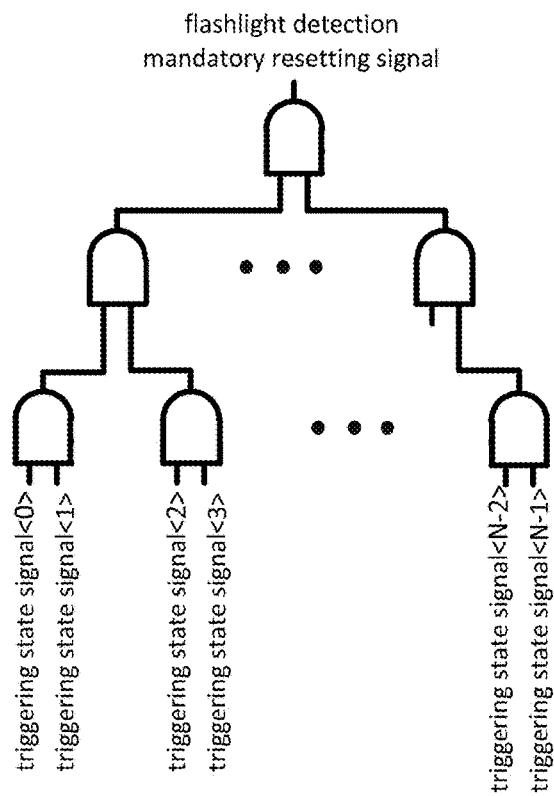

In the embodiments of the present disclosure, the decision-making sub-unit 1244 may be of various structures, and FIGS. 5A and 5B show two illustrative structures thereof. In FIG. 5A, a chain-like structure is shown, and in FIG. 5B, a tree-like structure is shown.

As shown in FIG. 5A, the decision-making sub-unit 1244 includes AND gates coupled to each other to form a chain-like structure and each having two input ends. Presumed that the decision-making sub-unit 1244 is configured to receive the triggering state signal from N flashlight detection units 300, the decision-making sub-unit 1244 may consist of N−1 AND gates connected in series to each other and each having two input ends. A first AND gate may receive triggering state signal from a first flashlight detection unit <0> and a second flashlight detection unit <1> (i.e., a triggering state signal <0> and a triggering state signal <1> in FIG. 5A), a second AND gate may receive an output from the first AND gate and a triggering state signal <2> from a third flashlight detection unit <2>, . . . , and a last AND gate may receive an output from a previous AND gate and a triggering state signal from a last flashlight detection unit, so the AND gates may form a chain-like structure. The last AND gate may output a flashlight detection mandatory resetting signal to the primary pixel array control unit 116 of the core circuit assembly 110.

As shown in FIG. 5B, the decision-making sub-unit 1244 includes AND gates coupled to each other to form a tree-like structure and each having two input ends. FIG. 5B shows a tree-like structure with three levels, but the present disclosure shall not be limited thereto. As mentioned hereinabove, presumed that the decision-making sub-unit 1244 is configured to receive the triggering state signal from N flashlight detection units 300, the AND gates (i.e., child nodes) of the decision-making sub-unit 1244 at a bottom level may receive the triggering state signals from all the flashlight detection units 300 (i.e., at least N/2 AND gates are arranged at the bottom level to receive N triggering state signals), and the triggering state signals may be transmitted from the AND gates at the bottom level to the AND gates at a top level (i.e., a root node). The AND gate at the top level may output the flashlight detection mandatory resetting signal.

In the chain-like structure in FIG. 5A and the tree-like structure in FIG. 5B, the decision-making sub-unit 1244 may output the active flashlight detection mandatory resetting signal when and merely when all the triggering state signals are active.

Figure 6:
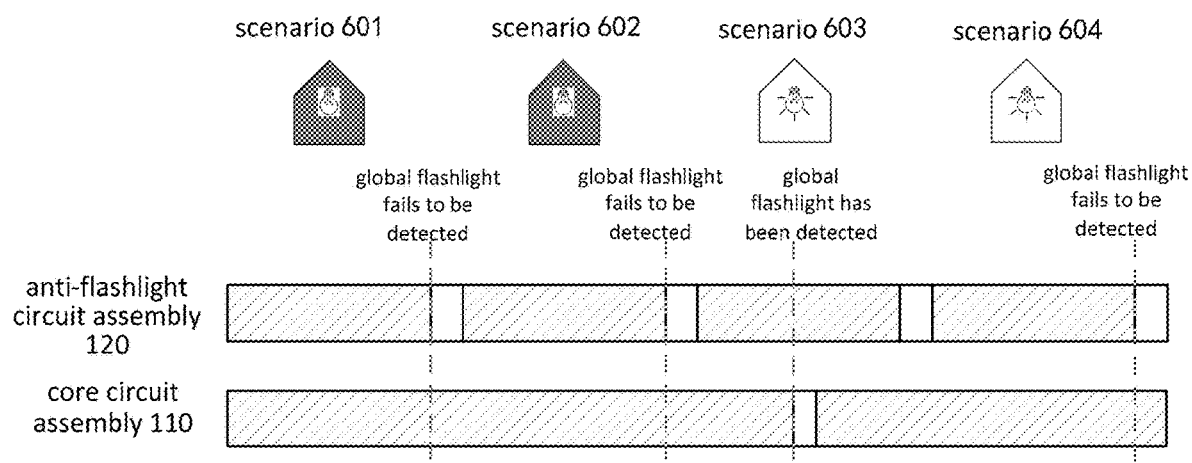
FIG. 6 is a schematic view showing an operating principle of the image sensor 100 according to one embodiment of the present disclosure.

FIG. 6 shows an operating principle of the image sensor 100.

FIG. 6 shows a scenario where the image sensor 100 is placed in a room with one lamp. At the very beginning, the lamp is not turned on, so the room is dark (as shown by 601 and 602). Then, the lamp is turned on, and the room is bright (as shown by 603 and 604). The anti-flashlight circuit assembly 120 may operate alternately between the flashlight detection enabling state and the flashlight detection refreshing state. FIG. 6 totally shows four periods, and the core circuit assembly 110 is in the light-intensity detection enabling state. It should be appreciated that, for ease of description, in FIG. 6, a rectangular bar is used to indicate an operating state of each of the anti-flashlight circuit assembly 120 and the core circuit assembly 110 that changes over time. For the anti-flashlight circuit assembly 120, a region filled with "I" represents that the anti-flashlight circuit assembly 120 is in the flashlight detection enabling state, and a blank region represents that the anti-flashlight circuit assembly 120 is in the flashlight detection refreshing state. For the core circuit assembly 110, a region filled with "I" represents that the core circuit assembly 110 is in the light-intensity detection enabling state, and a blank region represents that the core circuit assembly 110 is in the light-intensity detection resetting state.

Within a first period, the anti-flashlight circuit assembly 120 fails to detect any global flashlight in the field of view, so it enters the flashlight detection refreshing state at the end of the first period. At this time, the flashlight detection refreshing signal outputted by the flashlight detection control unit 124 may be active, and all the flashlight detection units 300 may be reset. Then, the flashlight detection refreshing signal may be cancelled for a next period.

Within a second period, the anti-flashlight circuit assembly 120 still fails to detect any global flashlight in the field of view.

Within a third period, the lamp in the room is turned on suddenly, and the anti-flashlight circuit assembly 120 has detected that there is global flashlight in the field of view, i.e., all the flashlight detection units 300 enter the triggered state due to the sufficient change in the light intensity. At this time, the flashlight detection control unit 124 may output the flashlight detection mandatory resetting signal to the primary pixel array control unit 116. Then, the core circuit assembly 110 may temporarily enter the light-intensity detection resetting state, so as to prevent the primary pixel unit 200 from responding to the global flashlight. After a short time period, the flashlight detection mandatory resetting signal may be cancelled, and the core circuit assembly 110 may enter the light-intensity detection enabling state again, so as to continuously respond to the change in the light intensity in the field of view. For the anti-flashlight circuit assembly 120, identical to the previous two periods, the flashlight detection control unit 124 may reset the flashlight detection pixel array 122 at the end of the third period, and the anti-flashlight circuit assembly 120 may enter the flashlight detection refreshing state. Then, the flashlight detection refreshing signal may be cancelled for a next period.

Within a fourth period, the anti-flashlight circuit assembly 120 still fails to detect any global flashlight in the field of view, so at the end of the fourth period, the anti-flashlight circuit assembly 120 may enter the flashlight detection refreshing state. At this time, the flashlight detection control unit 124 may output the active flashlight detection refreshing signal, and reset all the flashlight detection units 300.

Figure 7A:
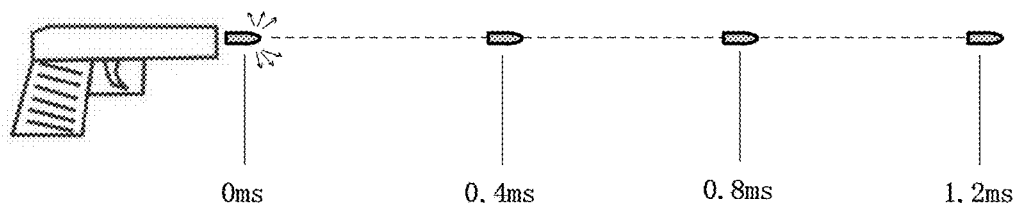
FIG. 7A is a schematic view showing an application scenario for the image sensor 100 according to one embodiment of the present disclosure.

In order to further describe the operating principle of the image sensor 300, FIG. 7A shows another specific application scenario.

The image sensor 100 is capable of capturing an image of an object moving at a high speed, so it may be applied to some special military fields. FIG. 7A shows a scenario where the image sensor 100 is used to capture an instantaneous image of a bullet out of a pistol, and a dotted line in FIG. 7A represents a movement trajectory of the bullet. Presumed that the field of view corresponding to the image sensor 100 has a length of 60 cm, and an instantaneous speed of the bullet is 500 m/s, it make take 1.2 ms for the bullet to reach a boundary of the field of view. When fired, gunpowder in the bullet burns and explodes, so as to push a warhead to move along a gun bore. At a moment when the warhead leaves the gun bore, flame and smoke occur in the vicinity of a muzzle. The flame may lead to flashlight in the entire field of view, so it may be considered as a global flashlight phenomenon. For ease of description, the moment when the bullet leaves the gun bore is defined as 0s.

For comparison, the operation of a conventional image sensor (i.e., a dynamic vision sensor) will be described at first. The conventional image sensor may respond to the change in the light intensity in the field of view all the time, so all the pixel units may be triggered at a time point 0 due to the global flashlight caused by the flame in the vicinity of the muzzle. Next, the dynamic vision sensor needs to read all the triggered pixel units, and before the reading, each triggered pixel unit may not respond to the change in the light intensity. It means that, within a reading period, it is impossible for the dynamic vision sensor to capture the movement trajectory of the bullet, i.e., the dynamic vision sensor may fails. In order to calculate a failure time, it is presumed that the dynamic vision sensor includes 1M pixel units (i.e., its resolution is 1M pixels) and a reading speed is 100M pixels per second, so it may take 0.01s for the dynamic vision sensor to read all the triggered pixel units, i.e., the failure time of the dynamic vision sensor caused by the global flashlight at the time point 0 may be 10 ms. Within 10 ms, the dynamic vision sensor needs to read all the triggered pixel units, so it is impossible for it to capture the movement trajectory of the bullet. However, after the reading, the bullet have already moved out of the field of view. In other words, within the failure time, the dynamic vision sensor cannot capture the movement trajectory of the bullet, so the dynamic vision sensor may be adversely affected by the global phenomenon.

The operation of the image sensor in the above scenario will be described hereinafter. At the time point 0, all the pixel units in the primary pixel array 112 and the flashlight detection pixel array 122 (i.e., the primary pixel units 200 and the flashlight detection units 300) may be triggered due to the global flashlight. The flashlight detection control unit 124 of the anti-flashlight circuit assembly 120 may determine that there is the global flashlight in the field of view, and transmit the flashlight detection mandatory resetting signal to the primary pixel array control unit 116. The primary pixel array control unit 116 may forcibly reset the primary pixel array within a short time period. The very short time period may be set as long as the primary pixel unit 200 is reset reliably, and usually, the time period may be at a scale of tens of microseconds, e.g., 50 microseconds. Within the time period of 50 microseconds, the core circuit assembly 110 may be reset, i.e., it may not respond to the change in the light intensity in the field of view. In other words, for the image sensor 100 in the embodiments of the present disclosure, the failure time caused by the global flashlight may be 50 microseconds. After 50 microseconds, the core circuit assembly 110 may detect the change in the light intensity in the field of view again, so as to capture the movement trajectory of the bullet.

Based on the above, as compared with the conventional dynamic vision sensor, the image sensor 100 in the embodiments of the present disclosure includes the additional anti-flashlight circuit assembly 120, so it is able to remarkably reduce the failure time of the core circuit assembly 110 due to the global flashlight, thereby to improve the resistance of the image sensor to the global flashlight.

Figure 7B:
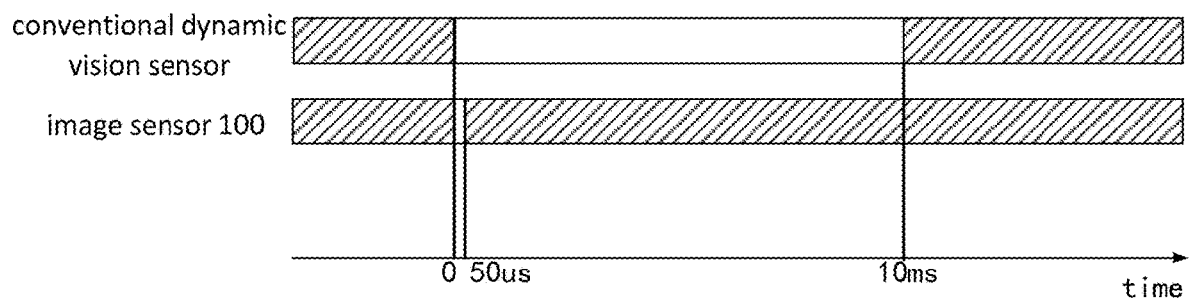
FIG. 7B is a schematic view showing comparison between failure times of image sensors in the application scenario in FIG. 7A.

In FIG. 7B, a region filled with "I" represents that the image sensor operates normally, a blank region represents that the image sensor fails, and a horizontal axis represents time. In the scenario as shown in FIG. 7A, the failure time of the conventional dynamic vision sensor caused by the global flashlight is 10 ms, while the failure time of the image sensor 100 in the embodiments of the present disclosure is merely 50 microseconds. Due to the decrease in the failure time, it is able for the image sensor to continuously detect the movement of the object in an environment with the global flashlight, thereby to improve the resistance of the image sensor to the global flashlight in the field of view.

It should be appreciated that, although with a large number of details, these specific details are not necessary for the implementation of the present disclosure. In some embodiments of the present disclosure, the known method, structure or technology is not shown, so as to facilitate the understanding of the present disclosure in a better manner.

It should be further appreciated that, sometimes the features of the present disclosure are described in conjunction with a single embodiment or figure, so as to facilitate the understanding of one or more aspects of the present disclosure. However, the method in the present disclosure shall not be construed as to reflect the intention that the present disclosure asks for more features than those specified in each claims. More definitely, as reflected in the appended claims, the creative aspect lies in the features less than all the features in the above-mentioned single embodiment. Hence, each claim following a specific embodiment may be definitely incorporated into the specific embodiment, and each claim itself may serve as an individual embodiment of the present disclosure.

It should be further appreciated that, modules, units or components in the above examples may be arranged in the device described in the embodiments, or in one or more devices different from the device. The modules may be combined into one module, or each module may be divided into a plurality of submodules.

It should be further appreciated that, the modules may be modified adaptively and arranged in one or more devices different from that mentioned hereinabove. The modules, units or components may be combined into one module, unit or component, or each module, unit or component may be divided into a plurality of submodules, subunits or subcomponents. Apart from the features, processes or units conflicting with each other, all the features, processes or units involved in the specification (including the appended claims, abstract and drawings) may be combined in any form. Unless otherwise defined, each feature in the specification (including the appended claims, abstract and drawings) may be replaced with a same, equivalent or similar feature.

The followings are also provided in the embodiments of the present disclosure.

A5. The flashlight detection unit according to any one of A1 to A4, wherein the first photoelectric detection module includes: a photodiode (PD1) whose anode is grounded; a first transistor (T1), a source electrode of which is coupled to a cathode of the photodiode and a drain electrode of which is coupled to a power source (VDD); and a first amplifier (A1) coupled between the cathode of the photodiode (PD1) and a gate electrode of the first transistor (T1).

A6. The flashlight detection unit according to A3, wherein the first pre-processing sub-module includes: a first capacitor (C1), a first end of which is coupled to an output end of the first photoelectric detection module; a second amplifier (A2), an input negative pole of which is coupled to a second end of the first capacitor (C1), and an input positive pole of which is configured to receive a fixed potential; and a second capacitor (C2), an adjustable resistor (R1) and a first switch (K1) connected in parallel between the input negative pole and an output end of the second amplifier (A2).

A7. The flashlight detection unit according to A3 or A6, wherein the first threshold comparison sub-module includes: a first voltage comparator (VC1), a reverse-phase input end of which is configured to receive a fixed level representing a first threshold, and a same-phase input end of which is coupled to the output end of the first pre-processing sub-module; a second voltage comparator (VC2), a same-phase input end of which is configured to receive a fixed level representing a second threshold, and a reverse-phase input end of which is coupled to the output end of the first pre-processing sub-module; and an OR logic unit coupled to output ends of the first voltage comparator and the second voltage comparator, and configured to perform an OR logic operation on outputs of the first voltage comparator and the second voltage comparator.

B10. The anti-flashlight circuit assembly according to B8 or B9, wherein the flashlight detection control unit includes: a refreshing sub-unit coupled to the flashlight detection pixel array via a flashlight detection refreshing signal line, and configured to output a flashlight detection refreshing signal to the flashlight detection pixel array; and a decision-making sub-unit coupled to the flashlight detection pixel array via a flashlight detection triggering signal line, coupled to the core circuit assembly via a flashlight detection mandatory resetting signal lien to the core circuit assembly, and configured to receive the triggering state signal from the flashlight detection pixel array, and when there is global flashlight, output a flashlight detection mandatory resetting signal to the core circuit assembly.

B11. The anti-flashlight circuit assembly according to B10, wherein the decision-making sub-unit includes AND gates coupled to each other to form a chain-like structure and each having two input ends, a first AND gate is configured to receive a first triggering state signal from a first flashlight detection unit and a triggering state signal from a second flashlight detection unit, each of a second AND gate to a last AND gate is configured to receive an output from the previous AND gate and a triggering state signal from a corresponding one of a third flashlight detection unit to a last flashlight detection unit, and the last AND gate is configured to output a flashlight detection mandatory resetting signal.

B12. The anti-flashlight circuit assembly according to B10, wherein the decision-making sub-unit includes AND gates coupled to each other to form a tree-like structure and each having two input ends, AND gates at a bottom level are configured to receive the triggering state signals from all the flashlight detection units and transmit the triggering state signals to an AND gate at a top level, and the AND gate at the top level is configured to output the flashlight detection mandatory resetting signal.

C17. The image sensor according to C15 or C16, wherein each primary pixel unit of the core circuit assembly includes: a second photoelectric detection module configured to monitor an optical signal in real time and output a corresponding electric signal; a second triggering generation module, a first input end of which is coupled to the second photoelectric detection module, a second input end of which is coupled to a primary pixel array control unit via a global resetting signal line, a first output end of which is coupled to a second interface logic module, and which is configured to generate a second triggering generation signal when the electric signal exceeds a predetermined threshold, and output the second triggering generation signal to the second interface logic module; and the second interface logic module, a first input end of which is coupled to the second triggering generation module, a second input end of which is coupled to the primary pixel array control unit via the global resetting signal line, a third input end and a fourth input end of which are coupled to a reading unit via a row request line and a column request line respectively, a first output end and a second output end of which are coupled to the reading unit via a row selection line and a column selection line respectively, and which is configured to transmit a row request signal to the reading unit upon the receipt of the second triggering generation signal, transmit a column request signal to the reading unit upon the receipt of a row selection signal from the reading unit, and turn on the second triggering generation module upon the receipt of the row selection signal and a column selection signal.

C18. The image sensor according to C17, wherein the second triggering generation module of the core circuit assembly includes: a second pre-processing sub-module, an input end of which is coupled to an output end of the second photoelectric detection module, and which is configured to pre-process the electric signal to generate a processed electric signal; and a second threshold comparison sub-module, an input end of which is coupled to an output end of the second pre-processing sub-module, and which is configured to determine whether a change in the processed electric signal meets a predetermined condition.

C19. The image sensor according to C18, wherein the second interface logic module of the core circuit assembly includes a second latch and a handshake protocol control logic.

C20. The image sensor according to C19, wherein the second latch of the core circuit assembly is configured to store and represent an operating state of a current primary pixel unit, a first resetting signal is a global resetting signal generated by the primary pixel array control unit, a second resetting signal is an output signal from the handshake protocol control logic, and a setting signal is the second triggering generation signal generated by the second triggering generation module.

C21. The image sensor according to C19 or C20, wherein the handshake protocol control logic of the core circuit assembly is configured to process an interaction between the primary pixel unit and the reading unit.

C22. The image sensor according to C21, wherein the handshake protocol control logic of the core circuit assembly is further configured to output the second resetting signal to the second latch when the row selection signal and the column selection signal are received by the primary pixel unit simultaneously.

C23. The image sensor according to any one of C15 to C22, wherein the reading unit of the core circuit assembly includes: a row selection module configured to respond to the row request signal from the primary pixel array, and output row address information about a row which has responded to the row request signal; a column selection module configured to response to a column request signal from the primary pixel array, and output column address information about a column which has responded to the column request signal; and a reading control module configured to control the output of the row address information and the column address information.

In addition, it should be appreciated that, although some embodiments include some features in the other embodiments, the combination of the features in different embodiments may also fall within the scope of the present disclosure. For example, the features in the appended claims may be combined in any form.

In addition, some of the embodiments have been described as a combination of methods or method elements capable of being implemented by a processor of a computer system or any other device. Hence, the processor including necessary instructions for implementing the methods or the method elements may be used to form a device for implementing the methods or the method elements. In addition, the device is used to achieve functions of the elements.

Unless otherwise defined, such ordinal numerals as "first", "second" and "third" are merely used to differentiate different components rather than to represent any order, number or importance.

Although with the above embodiments, a person skilled in the art may obtain the other embodiments, which also fall within the scope of the present disclosure. In addition, it should be appreciated that, the words are selected in the present disclosure principally for readability and guidance, but shall not be construed as limiting the scope of the present disclosure. Obviously, a person skilled in the art may make further modifications and improvements without departing from the spirit of the present disclosure. The above description is for illustrative but not restrictive purposes, and the scope of the present disclosure shall be subject to the appended claims.

What is claimed is:

1. A flashlight detection unit, comprising:
a first photoelectric detection module configured to monitor an optical signal in real time and output a corresponding electric signal;
a first triggering generation module, a first input end of which is coupled to the first photoelectric detection module, a first output end of which is coupled to a first interface logic module, and which is configured to generate a first triggering generation signal when the electric signal exceeds a predetermined threshold, and output the first triggering generation signal to the first interface logic module; and
the first interface logic module, a first input end of which is coupled to the first triggering generation module, a second input end of which is coupled to a flashlight detection control unit via a flashlight detection refreshing signal line, a first output end of which is coupled to the flashlight detection control unit via a flashlight detection triggering signal line, and which is configured to output a triggering state signal upon the receipt of the first triggering generation signal.

2. The flashlight detection unit according to claim 1, wherein a second input end of the first triggering generation module is coupled to the flashlight detection control unit via the flashlight detection refreshing signal line, and the first triggering generation module is further configured to receive a flashlight detection refreshing signal from the flashlight detection control unit, and not generate the first triggering generation signal upon the receipt of the flashlight detection refreshing signal.

3. The flashlight detection unit according to claim 2, wherein the first triggering generation module comprises:
a first pre-processing sub-module, an input end of which is coupled to an output end of the first photoelectric detection module, and which is configured to preprocess the electric signal to generate a processed electric signal; and
a first threshold comparison sub-module, an input end of which is coupled to an output end of the first preprocessing sub-module, and which is configured to determine whether a change in the processed electric signal meets a predetermined condition.

4. The flashlight detection unit according to claim 2, wherein the first interface logic unit further comprises a first latch configured to store and represent a current operating state, a resetting signal for the first latch is the flashlight detection refreshing signal generated by the flashlight detection control unit, and a setting signal for the first latch is the first triggering generation signal generated by the first triggering generation module.

5. The flashlight detection unit according to claim 4, wherein the first photoelectric detection module comprises:
a photodiode whose anode is grounded;
a first transistor, a source electrode of which is coupled to a cathode of the photodiode, and a drain electrode of which is coupled to a power source; and
an amplifier coupled between the cathode of the photodiode and a gate electrode of the first transistor.

6. The flashlight detection unit according to claim 3, wherein the first pre-processing sub-module comprises:
a first capacitor, a first end of which is coupled to the output end of the first photoelectric detection module;
a second amplifier, an input negative pole of which is coupled to a second end of the first capacitor, and an input positive pole of which is configured to receive a fixed potential; and a second capacitor, an adjustable resistor and a first switch connected in parallel between the input negative pole and an output end of the second amplifier.

7. The flashlight detection unit according to claim 6, wherein the first threshold comparison sub-module comprises:
a first voltage comparator, a reverse-phase input end of which is configured to receive a fixed level representing a first threshold, and a same-phase input end of which is coupled to the output end of the first pre-processing sub-module;
a second voltage comparator, a same-phase input end of which is configured to receive a fixed level representing a second threshold, and a reverse-phase input end is coupled to the output end of the first pre-processing sub-module; and
an OR logic unit coupled to output ends of the first voltage comparator and the second voltage comparator, and configured to perform an OR logic operation on outputs of the first voltage comparator and the second voltage comparator.

8. An anti-flashlight circuit assembly, comprising:
a flashlight detection pixel array comprising a plurality of the flashlight detection units according to claim 7, and configured to respond to a change in a light intensity in a field of view, and output a triggering state signal to a flashlight detection control unit when the change in the light intensity exceeds a predetermined threshold; and
the flashlight detection control unit coupled to the flashlight detection pixel array, and configured to determine whether there is global flashlight in the field of view, and when there is the global flashlight, transmit a flashlight detection mandatory resetting signal to a core circuit assembly.

9. The anti-flashlight circuit assembly according to claim 8, wherein the flashlight detection control unit is further configured to periodically output a flashlight detection refreshing signal to the flashlight detection pixel array.

10. The anti-flashlight circuit assembly according to claim 9, wherein the flashlight detection control unit comprises:
a refreshing sub-unit coupled to the flashlight detection pixel array via the flashlight detection refreshing signal line, and configured to output the flashlight detection refreshing signal to the flashlight detection pixel array; and
a decision-making sub-unit coupled to the flashlight detection pixel array via a flashlight detection triggering signal line, coupled to the core circuit assembly via a flashlight detection mandatory resetting signal line to the core circuit assembly, and configured to receive the triggering state signal from the flashlight detection pixel array, and when there is the global flashlight, output a flashlight detection mandatory resetting signal to the core circuit assembly.

11. The anti-flashlight circuit assembly according to claim 10, wherein the decision-making sub-unit comprises AND gates coupled to each other to form a chain-like structure and each having two input ends, a first AND gate is configured to receive a first triggering state signal from a first flashlight detection unit and a triggering state signal from a second flashlight detection unit, each of a second AND gate to a last AND gate is configured to receive an output from a previous AND gate and a triggering state signal from a corresponding one of a third flashlight detection unit to a last flashlight detection unit, and the last AND gate is configured to output the flashlight detection mandatory resetting signal.

12. The anti-flashlight circuit assembly according to claim 10, wherein the decision-making sub-unit comprises AND gates coupled to each other to form a tree-like structure and each having two input ends, AND gates at a bottom level are configured to receive the triggering state signals from all the flashlight detection units and transmit the triggering state signals to an AND gate at a top level, and the AND gate at the top level is configured to output the flashlight detection mandatory resetting signal.

13. An image sensor, comprising:
a core circuit assembly comprising a plurality of primary pixel units, and configured to trigger a corresponding primary pixel unit when a change in a light intensity in the field of view reaches a threshold, and output address information about the triggered primary pixel unit; and
the anti-flashlight circuit assembly according to claim 12 arranged in such a manner as to surround the core circuit assembly, and configured to detect whether there is global flashlight in the field of view, and when there is the global flashlight, reset the core circuit assembly so as to prevent the core circuit assembly from responding to the global flashlight and outputting corresponding information.

14. The image sensor according to claim 13, wherein the anti-flashlight circuit assembly comprises a plurality of flashlight detection units each configured to detect the change in the light intensity in the field of view within a flashlight detection period, and the anti-flashlight circuit assembly is further configured to determine whether there is the global flashlight in the field of view in accordance with the change in the light intensity in the field of view.

15. The image sensor according to claim 14, wherein the core circuit assembly comprises:
a primary pixel array comprising a plurality of primary pixel units, and configured to monitor the change in the light intensity in the field of view, and enter a triggered state when the change in the light intensity meets a predetermined condition;
a reading unit configured to respond to the primary pixel unit in the triggered state and output address information about the primary pixel unit; and
a primary pixel array control unit configured to transmit a global resetting signal to each primary pixel unit to control an operating state of each primary pixel unit.

16. The image sensor according to claim 15, wherein the primary pixel array control unit is further configured to, during the initialization, transmit the global resetting signal to each primary pixel unit in the primary pixel array via a global resetting signal line so as to turn off the primary pixel unit, and upon the receipt of a flashlight detection mandatory resetting signal from the anti-flashlight circuit assembly, transmit the global resetting signal to each primary pixel unit in the primary pixel array via the global resetting signal line so as to turn off the primary pixel unit.

17. The image sensor according to claim 16, wherein each primary pixel unit of the core circuit assembly comprises:
a second photoelectric detection module configured to monitor an optical signal in real time and output a corresponding electric signal;
a second triggering generation module, a first input end of which is coupled to the second photoelectric detection module, a second input end of which is coupled to the primary pixel array control unit via the global resetting signal line, a first output end of which is coupled to a second interface logic module, and which is configured to generate a second triggering generation signal when the electric signal exceeds a predetermined threshold, and output the second triggering generation signal to the second interface logic module; and the second interface logic module, a first input end of which is coupled to the second triggering generation module, a second input end of which is coupled to the primary pixel array control unit via the global resetting signal line, a third input end and a fourth input end of which are coupled to the reading unit via a row request line and a column request line respectively, a first output end and a second output end of which are coupled to the reading unit via a row selection line and a column selection line respectively, and which is configured to transmit a row request signal to the reading unit upon the receipt of the second triggering generation signal, transmit a column request signal to the reading unit upon the receipt of a row selection signal from the reading unit, and turn on the second triggering generation module upon the receipt of the row selection signal and a column selection signal.

18. The image sensor according to claim 17, wherein a second latch of the core circuit assembly is configured to store and represent an operating state of a current primary pixel unit, a first resetting signal is the global resetting signal generated by the primary pixel array control unit, a second resetting signal is an output signal from a handshake protocol control logic, and a setting signal is the second triggering generation signal generated by the second triggering generation module.

19. The image sensor according to claim 18, wherein the handshake protocol control logic of the core circuit assembly is configured to process an interaction between the primary pixel unit and the reading unit, and output the second resetting signal to the second latch when the row selection signal and the column selection signal are received by the primary pixel unit simultaneously.

20. The image sensor according to claim 19, wherein the reading unit of the core circuit assembly comprises:
  a row selection module configured to respond to the row request signal from the primary pixel array, and output row address information about a row which has responded to the row request signal;
  a column selection module configured to response to a column request signal from the primary pixel array, and output column address information about a column which has responded to the column request signal; and
  a reading control module configured to control the output of the row address information and the column address information.

* * * * *